United States Patent [19]
Raamot

[11] 3,766,402
[45] Oct. 16, 1973

[54] DIGITAL-TO-ANALOG CONVERTER PARALLEL-CURRENT VOLTAGE REGULATING CIRCUIT

[75] Inventor: Jaan Raamot, Franklin Twsp., Somerset Cty., N.J.

[73] Assignee: Western Electric Company, Incorporated, New York, N.Y.

[22] Filed: Mar. 9, 1971

[21] Appl. No.: 122,496

Related U.S. Application Data

[62] Division of Ser. No. 805,543, March 10, 1969, abandoned.

[52] U.S. Cl. .................. 307/44, 307/40, 323/22 T, 323/25, 323/80, 340/347 DA
[51] Int. Cl. ...................... G05f 1/56, H03k 13/04
[58] Field of Search ................... 323/1, 16, 17, 19, 323/227, 7, 15, 25; 330/69, 97, 105, 106, 112; 307/44, 64, 65, 66

[56] References Cited
UNITED STATES PATENTS

| | | |
|---|---|---|
| 3,343,073 | 9/1967 | Mesenhimer ........................ 323/15 |
| 3,531,598 | 9/1970 | McNair, Jr. .................... 323/15 UX |
| 2,881,266 | 4/1959 | Miller .............................. 330/97 X |
| 3,374,424 | 3/1968 | Wiechmann ..................... 323/22 T |
| 3,209,277 | 9/1965 | Burwen ............................... 330/69 |
| 3,239,733 | 3/1966 | Sikorra ........................... 330/69 X |
| 3,564,444 | 2/1971 | Walsh ................................. 330/69 |

Primary Examiner—A. D. Pellinen
Attorney—W. M. Kain

[57] ABSTRACT

A parallel-current voltage regulating circuit supplies a compensating current to a load resistor primarily energized from an unregulated source so that the voltage across the load resistor is maintained equal to a reference voltage. Dual regulating circuits are used when the polarity of the voltage across the load is reversible.

2 Claims, 9 Drawing Figures

FIG. 1b  PRIOR ART
| DIGITAL INPUT | $S_1$ | $S_2$ | $S_3$ | $E_0$ |
|---|---|---|---|---|
| 000 | OPEN | OPEN | OPEN | 0=GROUND |
| 001 | OPEN | OPEN | CLOSED | $2/22\ E_{ref}$ |
| 010 | OPEN | CLOSED | OPEN | $4/22\ E_{ref}$ |
| 011 | OPEN | CLOSED | CLOSED | $6/22\ E_{ref}$ |
| 100 | CLOSED | OPEN | OPEN | $8/22\ E_{ref}$ |
| 101 | CLOSED | OPEN | CLOSED | $10/22\ E_{ref}$ |
| 110 | CLOSED | CLOSED | OPEN | $12/22\ E_{ref}$ |
| 111 | CLOSED | CLOSED | CLOSED | $14/22\ E_{ref}$ |
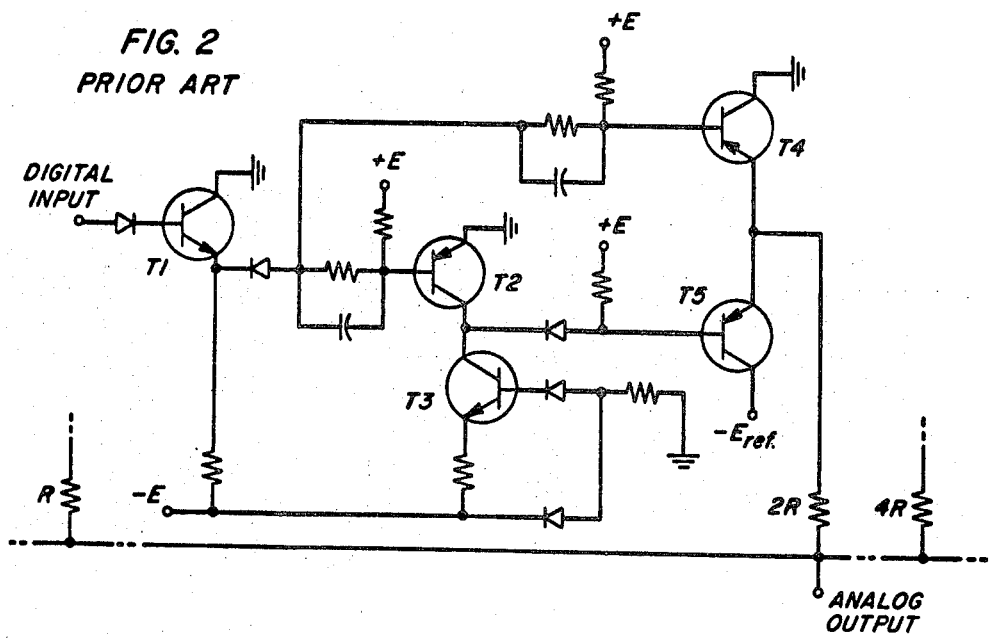
FIG. 2 PRIOR ART
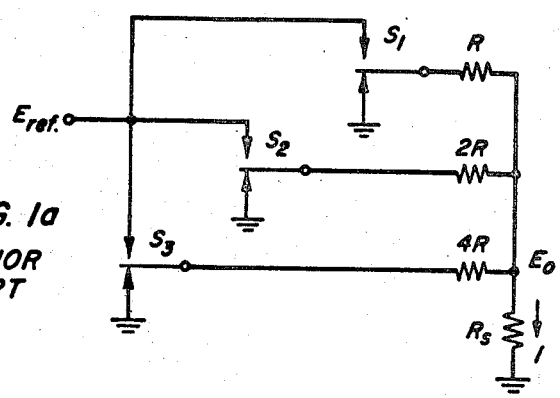
FIG. 1a PRIOR ART

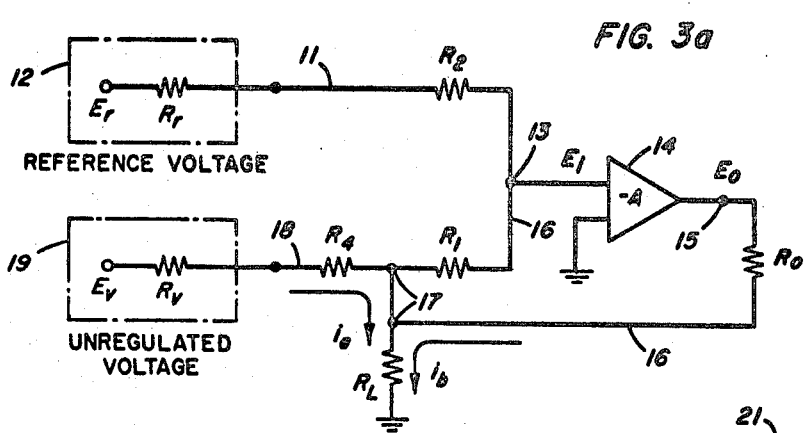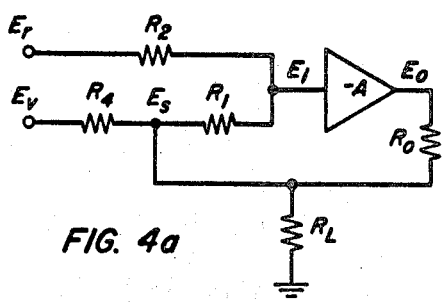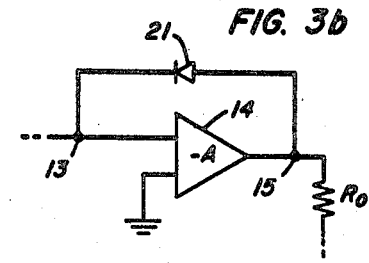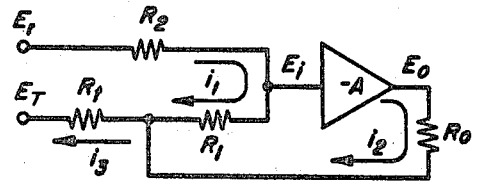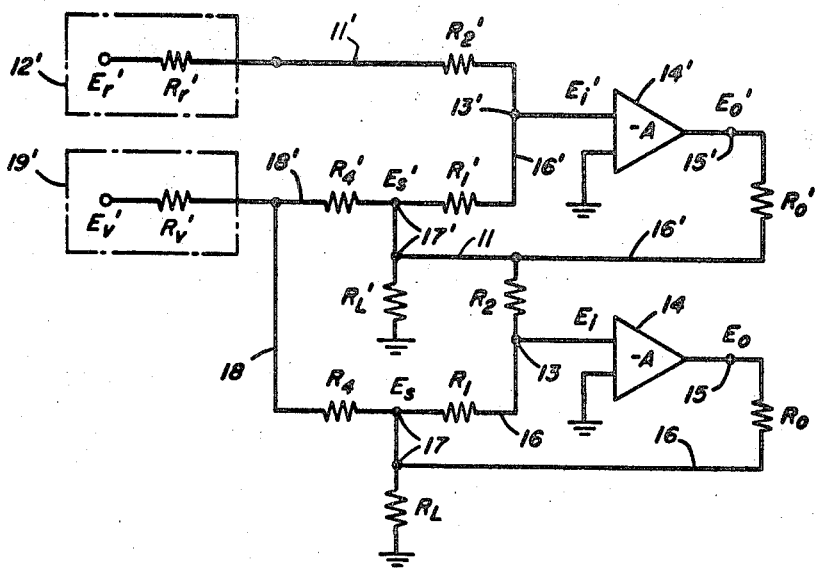

3,766,402

DIGITAL-TO-ANALOG CONVERTER PARALLEL-CURRENT VOLTAGE REGULATING CIRCUIT

This is a division of U.S. Pat. application Ser. No. 805,543, filed Mar. 10, 1969, now abandoned.

BACKGROUND OF THE INVENTION

1. Field of the Invention

This invention relates to a parallel-current voltage regulating circuit and more particularly to a parallel current regulating circuit for use with a digital-to-analog converter having a high degree of resolution.

2. Description of the Prior Art

A digital-to-analog converter is a device for converting electrical signals in digital form into their analog equivalent. Such convertors are widely used as an interface between a digital computer and a utilization device which cannot be directly operated by digital signals. For example, a digital-to-analog converter is used to convert digital signals generated by a computer into analog signals to control a machine tool in a computer-controlled machine-tool operation.

Digital computers are, of course, inherently accurate machines, their accuracy being limited solely by the size of the digital words that can be accommodated in the registers and accumulators of the computer. Double and triple length words may be used for extended precision, in some instances. The commercial digital-to-analog converters which are currently available, however, are not capable of converting digital input signals into their analog equivalent with the same degree of resolution inherently possessed by the digital input signals. Prior art digital-to-analog converters typically comprise a network of binary-weighted resistors connected to a common summing resistor. A series of switches associated with the binary-weighted resistors selectively connect a regulated voltage to each resistor in the network, in accordance with the digits of the binary word to be converted. The correspondingly weighted currents which flow in the binary-weighted resistors are summed in a summing resistor or in a load to produce the desired analog signal.

Digital-to-analog converters of this type suffer from several disadvantages. First, the energizing voltage for the network of binary-weighted resistors must be highly regulated. This is difficult to do because the voltage source must supply a considerable amount of current and must have a relatively high potential, if any reasonable degree of resolution is required. While voltage sources having a high degree of regulation accuracy are commercially available, these sources are accurate only when supplying a constant or slowly varying load. When connected to a rapidly and constantly varying load, as is found for example in a digital-to-analog converter, the regulating accuracy drops to a much lower figure, typically 0.01 percent. This drop in accuracy is caused by limitations in the regulating circuitry itself as well as uncertainties as to the internal impedance of the voltage source. Furthermore, such a voltage source is relatively expensive and the above-mentioned limitation on the degree of voltage regulation which can be obtained of necessity limits the resolution of prior art digital-to-analog converter to approximately 13 bits. Additionally, in the prior art, the regulation of the energizing voltage source always occurs before the source is switched to energize the binary-weighted resistors. Thus, if electromechanical switching devices are used, contact resistance also becomes limiting. On the other hand, if semiconductor switching is used, the wide manufacturing variations between semiconductors of the same type and the consequent unpredictable voltage drops through the transistors when conducting, are also limiting. The use of field-effect transistors promises to improve this situation slightly, but by not more than one bit, at the very best. Thus, practically speaking, prior art digital-to-analog converters are inherently limited to a resolution of less than 14 bits.

The novel circuitry of the digital-to-analog converter disclosed herein, however, can attain an accuracy and degree of resolution which are both at least one order of magnitude better than that obtained in the prior art. An experimental 18-bit digital-to-analog converter has been constructed and operated. The resolution of this experimental converter is limited only by the state of the art, which at the present time can achieve resistor values and reference voltage sources accurate to one part per million. As the art progresses it will be possible to increase the resolution of digital-to-analog converters constructed according to the principles of this invention as well as those constructed according to the teachings of the prior art, but the novel circuitry disclosed herein is such that the instant digital-to-analog converter will always have an accuracy at least one order of magnitude greater than the prior art.

A preferred embodiment of the invention comprises a ladder network of binary-weighted resistors connected to a summing load. An unregulated voltage source is connected through a corresponding series of switching circuits to each resistor in the ladder network. These switching circuits are selectively energized, in accordance with the digits of the binary number to be converted, and connect the unregulated voltage source to each resistor in the binary-weighted ladder network to thereby generate the analog signal.

An important feature of the invention is the highly accurate regulation of the unregulated energizing voltage after this unregulated voltage has been switched to energize each binary-weighted resistor. This regulation is accomplished by a novel parallel-current regulating circuit comprising a highly accurate source of reference potential, and an operational amplifier having a feedback loop connected to supply a compensatory regulating current to the resistor, in parallel with the current supplied by the unregulated source, thereby maintaining the potential developed across the binary-weighted resistor equal to the potential of the reference voltage.

BRIEF DESCRIPTION OF THE DRAWING

FIG. 1a is a schematic diagram of a typical prior art digital-to-analog converter;

FIG. 1b is a chart showing the operation of the converter shown in FIG. 1a and is helpful in understanding the operation of both the prior art converter shown in FIG. 1a and the instant invention;

FIG. 2 is a schematic drawing of a portion of another prior art digital-to-analog converter which illustrates the use of transistorized switching circuitry;

FIG. 3a is a schematic drawing of a parallel-current regulating circuit suitable for use with the present invention;

FIG. 3b is a schematic drawing illustrating an alternative arrangement for the regulating circuit shown in FIG. 3a;

FIG. 4a is a simplified schematic drawing of the regulating circuit shown in FIG. 3a which is useful in the mathematical analysis thereof;

FIG. 4b is another simplified schematic drawing of the regulating circuit shown in FIG. 3a which is also useful in the mathematical analysis thereof;

FIG. 5 is a schematic drawing of an alternative embodiment of the parallel-current regulating circuit according to FIG. 3a which provides an even greater degree of regulation.

DESCRIPTION OF THE PREFERRED EMBODIMENT

Figure 6:
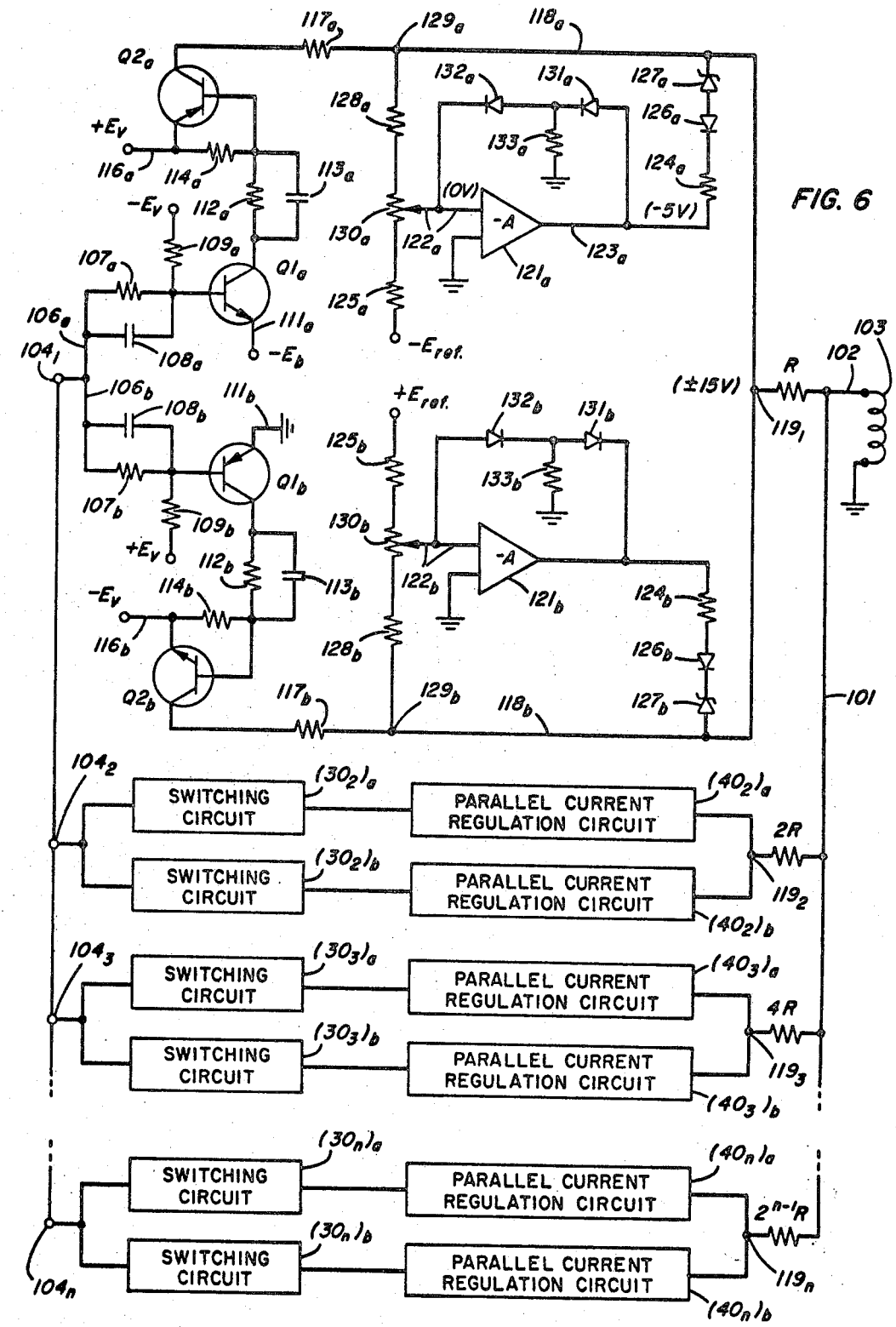
FIG. 6 is a schematic drawing of an illustrative embodiment of a digital-to-analog converter according to the present invention.

FIG. 1a is a schematic drawing of a 3-bit digital-to-analog converter which is typical of the prior art. In this converter a ladder network of three binary-weighted resistors, R, 2R and 4R, is connected at one end via a summing resistor $R_s$ to ground. Switches $S_1$, $S_2$ and $S_3$ represent electromechanical switching devices which can selectively connect the free end of any of the binary-weighted resistors either to ground or to a common reference voltage $+E_{ref}$. The switches $S_1$ through $S_3$ are shown in their normal, or open, position and in that position the switches connect ground to each of the binary-weighted resistors. When operated, however, each of the switches $S_1$ through $S_3$ applies the potential $+E_{ref}$ to the associated binary-weighted resistor causing current flow therethrough. The output voltage, $E_0$, developed across the summing resistor $R_s$ may be calculated by taking the ratio of resistor $R_s$ and all binary-weighted resistors in parallel with it to the sum of that quantity just calculated and the parallel combination of all binary-weighted resistors connected through operated switches to the reference source. Because the binary-weighted resistors have resistance values which increase according to the powers of 2, the output voltage $E_0$ will increase linearly when switches $S_1$ through $S_3$ are selectively closed in binary order.

FIG. 1b illustrates the operation of the converter in FIG. 1a and shows the condition of switches $S_1$ through $S_3$ for various combinations of input signals as well as the output voltage $E_0$ developed across the summing resistor $R_s$ for each combnation. This table assumes that $R_s = R$. If desired, the circuitry can be arranged so that switches $S_1$ through $S_3$ switch the binary-weighted resistors between $-E_{ref}$ and $+E_{ref}$ rather than ground the $+E_{ref}$; however, the linear relationship between the analog output $E_0$ and the binary input will not be affected. In this latter case the graph of $E_0$ versus the binary input would be shifted downward and would pass through the $E_0 = 0$ point between the binary input numbers 011 and 100 rather than at the normal 000 point. This type or arrangement is used, for example, if the analog signal is to be used to control the deflection of an electron beam and it is desired that the rest position of the beam be at the center of the cathode ray screen.

By increasing the number of binary-weighted resistors in FIG. 1a, it is possible to increase the resolution of such a converter. However, as discussed previously, if more than 12 or 13 binary-weighted resistors are connected to the converter, the change in output voltage $E_0$ across summing resistor $R_s$ as the last switch, corresponding to the least significant digit of the binary number to be converted, is operated, is so small that the reference voltage source $E_{ref}$ must be exceedingly well regulated. This is necessary so that no voltage perturbations will occur in $E_{ref}$ which even approach in magnitude the voltage change across $R_s$ due to a change in the least significant digit of the binary number.

The cost and difficulty of regulating a power supply for use with a digital-to-analog converter having more than 13 bits has already been discussed. The contact resistance of electromechanical switches $S_1$ through $S_n$ must also be less than the change in resistance which occurs as the last binary-weighted resistor is switched in and out of the circuit. This, too, limits the resolution of the digital-to-analog converter shown in FIG. 1a.

As previously discussed, this problem can be alleviated somewhat by the use of semiconductor switches. FIG. 2 is a schematic diagram of a portion of a commercially available 13-bit digital-to-analog converter which uses semi-conductor switching elements. Referring to FIG. 2, when transistor $T_5$ is turned "On" by the application of a binary "one" signal to the base of transistor $T_1$, the voltage from source $-E_{ref}$ is applied to the binary-weighted resistor 2R, as shown. Similarly, the application of a binary "zero" signal to the base of transistor $T_1$ turns transistor $T_5$ "Off" and transistor $T_4$ "On" thus connecting a ground to binary-weighted resistor 2R. The alternate operation of transistors $T_4$ and $T_5$ is analogous to the operation of one of the electromechanical switches in FIG. 1a. Obviously, the use of transistors in lieu of electromechanical switches eliminates the contact resistance problem but introduces yet another problem in its place. As is well known, when a semiconductor switching device is turned heavily "On," it simulates a short circuit in that the resistance of the emitter-collector path is very low. There is, nevertheless, a finite voltage drop across a conducting transistor and this voltage drop must be taken into account in a high resolution digital-to-analog converter. At this time, it is still not possible to manufacture transistors accurately enough so that the collector-emitter voltage drop in the "On" condition is uniform from sample to sample. Thus, difficulty is experienced in calibrating the various stages of a digital-to-analog converter which uses transistorized switching and if a transistor fails and must be replaced, the entire converter must be recalibrated, as each stage interacts with every other stage. Thus, while the use of transistorized switching circuits, particularly field-effect transistors, may increase the resolution of prior art converters by one or possibly two bits, the limitations imposed by the inability to accurately regulate the reference voltage source after switching occurs are still limiting.

The instant invention successfully eliminates the aforementioned problems and provides a digital-to-analog converter which is significantly superior to anything heretofore attainable. This superiority is attained by the novel concept of regulating an unregulated voltage source after it has been switched to generate current flow in a binary-weighted resistor and by using a unique parallel-current regulating circuit to maintain this regulation to a very high degree of accuracy.

FIG. 3a depicts one embodiment of the parallel-current regulating circuit utilized in the instant digital-to-analog converter. Referring to the drawing, a circuit 11 supplies a reference voltage from an external voltage source 12 which may advantageously comprise a standard cell having an open-circuit voltage $E_r$ and an internal impedance $R_r$. The standard cell, whose voltage must be accurately known, for example to at least one part per million, is maintained at a constant temperature by the use of an oven. The circuit 11 connects the reference voltage source 12 to the input 13 of an operational amplifier 14 via a resistor $R_2$. The other input of operational amplifier 14 is grounded. In the experimental digital-to-analog converter actually constructed and operated, a commercially available Analog Devices Model 211 operational amplifier was used. This amplifier has a gain of $A = 10^8$, an input resistance of 0.5 megohms, an output resistance of essentially zero ohms, and a noise factor of 10 microvolts r.m.s. Obviously one skilled in the art could substitute other types of operational amplifiers for the one used in the experimental embodiment provided that the characteristics are similar. The output 15 of operational amplifier 14 is connected by a feedback loop 16 to the input 13 thereof. An output resistor $R_0$ and a resistor $R_1$ are connected in the feedback loop. $R_L$, the load resistor to be energized, is connected between ground and the juncture of resistors $R_1$ and $R_0$ in feedback loop 16. A second circuit 18 connects an unregulated voltage from an external voltage source 19 to the juncture 17 of resistors $R_1$ and $R_0$ via a resistor $R_4$. The unregulated voltage source 19 advantageously comprises any suitable source having a voltage $E_v$ and an internal impedance $R_v$.

In operation, the unregulated voltage source 19 supplies a current through $R_4$ and $R_L$ to ground, and the voltage $E_s$ which is developed across load resistor $R_L$ at juncture 17 is regulated so that it equals the open circuit voltage $E_r$ of reference voltage source 12 to a high degree of accuracy, regardless of wide variations in the magnitude of the voltage from unregulated voltage source 19. If, as in the illustrative embodiment, the potential of reference source 12 is known within one part per million then resistors $R_1$, $R_2$ and $R_L$ must also be accurate to within one part per million or better.

Assume that unregulated voltage source 19 is supplying a current $i_a$ to load resistor $R_L$ and that the voltage developed across juncture 17 is $E_s$. The potential of unregulated voltage source 19 is "seen" by the input of operational amplifier 14 through resistors $R_4$ and $R_1$, $R_1$ being in feedback loop 16. Input 13 of operational amplifier 14 also "sees" the potential from reference voltage source 12 through resistor $R_2$. In order that the operational amplifier will regulate over the desired range, the magnitude of resistors $R_2$ and $R_1$ are selected such that $R_1$ is approximately equivalent to the series combination of $R_2$ and the internal resistance $R_r$ of reference voltage source 12. Typically, $R_r$ is negligibly small and, thus in practice, $R_2$ will equal $R_1$. If the potential of unregulated voltage source 19 should vary for any reason, the magnitude of voltage $E_s$ will also tend to vary. This variation is sensed at the input of operational amplifier 14 and an output current is generated in feedback loop 16. A fraction, $i_b$, of this current will flow through load resistor $R_L$. Since $i_b$ is in parallel with $i_a$ the current supplied from feedback loop 16 will tend to alter the magnitude of $E_s$, in an offsetting manner, and maintain $E_s$ equal to the voltage of reference voltage source 12. For this to occur, it is necessary that the magnitude of resistor $R_4$ be selected so that its resistance, together with the internal impedance $R_v$ of unregulated voltage source 19, approximately equals the resistance of load resistor $R_L$. Load resistor $R_L$ will, of course, vary in resistance for each stage of the digital-to-analog converter.

A mathematical analysis of this circuit is set forth below and this analysis proves that the parallel-current regulating circuit shown in FIG. 3 doe indeed maintain the voltage $E_s$ developed across load resistor $R_L$ equal to the voltage of reference voltage source 12.

FIG. 4a shows the circuit of FIG. 3a redrawn in simplified form. The internal resistance $R_r$ of reference voltage source 12 and the internal resistance $R_v$ of unregulated voltage source 19 have been ignored, as typically they are very small compared to $R_2$ and $R_4$, respectively. If they are not small compared to $R_2$ and $R_3$, the following mathematical analysis is still valid provided that $R_2^1$ and $R_4^1$ are substituted in the following proof where $$R_2^1 = R_2 + R_r \ldots \tag{1}$$

and $$R_4^1 = R_4 + R_v \ldots \tag{2}$$

FIG. 4a itself may be further simplified, as shown in FIG. 4b, by defining two new quantities $R_T$ and $E_T$ where $$R_T = R_4 R_L/R_4 + R_L \ldots \tag{3}$$

and $$E_T = R_L/R_4 + R_L \cdot E_v \ldots \tag{4}$$

Assume that currents $i_1$, $i_2$ and $i_3$ flow as shown in FIG. 4b. No current is shown flowing into the operational amplifier as it normally requires no input current.

Now the currents $i_1$, $i_2$ and $i_3$ may be found from the following equations.

$$i_1 = E_r - E_s/R_1 + R_2 \ldots \tag{5}$$

$$i_2 = E_0 - E_s/R_0 \ldots \tag{6}$$

and $$i_3 = E_s - E_T/R_T \ldots \tag{7}$$

But $$E_0 = -A E_i \ldots \tag{8}$$

and $$E_i = (R_1/R_1 + R_2) \cdot (E_r - E_s) + E_s \ldots \tag{9}$$

$$= (R_1/R_1 + R_2) \cdot E_r + (R_2/R_1 + R_2) \cdot E_s \ldots \quad (10)$$

Now $$i_1 + i_2 = i_3 \ldots \quad (11)$$

Therefore, from Equations 5, 6, 7 and 11

$$(E_r - E_s/R_1 + R_2) + (E_0 - E_s/R_0) = E_s - E_T/R_T \ldots \quad (12)$$

and from Equations 8 and 10

$$E_0 = (-A\,R_1/R_1 + R_2) \cdot E_r - (A\,R_2/R_1 + R_2) \cdot E_s \ldots \quad (13)$$

From Equations 12 and 13, we obtain $$(E_r - E_s/R_1 + R_2) - (A\,R_1\,E_r/R_0(R_1 + R_2)) - (A\,R_2\,E_s/R_0(R_1 + R_2)) - E_s/R_0 = E_s - E_T/R_T \quad (14)$$

Simplifying this expression we get:

$$E_T\left[\frac{1}{(R_1+R_2)} - \frac{AR_1}{R_0(R_1+R_2)}\right] + \frac{E_T}{R_T}$$
$$= E_s\left[\frac{1}{R_T} + \frac{1}{R_0} + \frac{1}{(R_1+R_2)}\right] + \frac{AR_2}{R_0(R_1+R_2)} \quad (15)$$

Thus $$\frac{E_r}{(R_1+R_2)}\left[1 - \frac{AR_1}{R_0}\right] + \frac{E_T}{R_T} \cdot 1 \frac{(R_1+R_2)}{(R_1+R_2)}$$
$$= \frac{E_s}{(R_1+R_2)}\left(\frac{(R_0+R_T)(R_1+R_2)}{R_0R_T} + 1 + \frac{AR_2}{R_0}\right) \quad (16)$$

Simplifying we get $$E_r(R_0R_T - AR_1R_T) + E_T(R_1+R_2)R_0$$
$$= E_s[(R_0+R_T)(R_1+R_2) + R_0R_T + AR_2R_T] \quad (17)$$

Therefore $$E_s = \frac{E_r(R_0R_T - AR_1R_T)}{[(R_0+R_T)(R_1+R_2) + R_0R_T + AR_1R_T]}$$
$$+ \frac{E_T(R_1+R_2)R}{[(R_0+R_T)(R_1+R_2) + R_0R_T + AR_1R_T]} \quad (18)$$

Now from Equation 3

$$R_T = R_4R_L/R_4 + R_L \ldots \quad (19)$$

and $$R_4 \text{ typical} \cong 300 \text{ ohms}$$
$$R_L \text{ typical} \cong 500 \text{ ohms}$$

Thus $$R_T \text{ typical} \cong 300 \times 500/800 = 200 \text{ ohms}$$

Further, in a typical digital-to-analog converter stage $$R_0 \text{ typical} \cong 500 \text{ ohms}$$
$$R_1 \text{ typical} \cong 10,000 \text{ ohms}$$
$$R_2 \text{ typical} \cong 10,000 \text{ ohms}$$

and $$A \text{ typical} \cong 10^8$$

Substituting these values into Equation 18, we get $$E_s = \frac{E_r[(500)(200) - (10^8)(10,000)(200)]}{[(700)(20,000) + (100,000) + (10^8)(10,000)(200)]}$$
$$+ \frac{E_T(20,000)(500)}{[(700)(20,000) + (100,000) + (10^8)(10,000)(200)]}$$

$$E_s = (E_r[10 - (200)(10^8)]/[1400 + 10 + 200(10^8)])$$
$$+ (E_T(100)/140 + 1 + 20 + 10^8)$$

Therefore $$E_s \cong (-E_r(10^8)/(10^8)) + (E_T/(10^7))$$

or $$E_s \cong -E_r + (E_T/10^7)$$

Ignoring this latter term, which is exceedingly small, we get $E_s = -E_r$ and the effect of $E_T$ (and thus $E_v$) upon $E_s$ may be ignored.

Another important feature of the parallel-current regulating circuit shown in FIG. 3a is its excellent response to transient switching pulses. An experimental regulator, constructed in accordance with this invention, was found to have a settling time of less than 1 microsecond. This figure is suitable for virtually all applications which require a digital-to-analog converter of this degree of resolution.

FIG. 3b shows a modified version of the circuit disclosed in FIG. 3a. In FIG. 3b a diode 21 is connected between output lead 15 and input 13 and poled out so that if the output voltage $E_0$ of operational amplifier 14 goes positive, diode 21 conducts shorting out the operational amplifier 14. Obviously, diode 21 could be poled in the opposite direction if it is desired to short-out operational amplifier 14 when the output voltage goes negative.

It is possible to improve still further the parallel-current regulating circuit shown in FIG. 3a. As shown in FIG. 5, this is accomplished by substituting for the external reference voltage source 12 in FIG. 3a, an unregulated voltage source which itself has been regulated by a parallel-current regulating circuit of the type disclosed in FIG. 3a. This process may be repeated over and over again although practical considerations make the use of more than two parallel-current regulating circuits in "tandem" of doubtful value. Referring now to FIG. 5, a circuit 11¹ connects a reference voltage source 12¹ to a resistor $R_2^1$ thence to the input 13¹ of an operational amplifier 14¹. A feedback loop 16¹ which includes an output resistor $R_0^1$ and a resistor $R_1^1$ connects the output $15^1$ of operational amplifier $14^1$ to the input $16^1$. A load resistor $R_L^1$ is connected to the juncture $17^1$ of resistors $R_0^1$ and $R_1^1$ and is supplied with current from an external unregulated source $19^1$ through a resistor $R_4^1$.

The operation of the portion of the circuit disclosed in FIG. 5 described so far is identical with that described for FIG. 3a and will not be repeated here. Suffice it to say that the voltage $E_s^1$ developed across load resistor $R_L^1$ is held to the voltage of reference source $12^1$. Importantly, no significant current is drawn from the standard cell in reference source $12^1$.

The regulated voltage $E_s^1$ developed across resistor $R_L^1$ is next connected via circuit 11 and resistor $R_2$ to the input of a second operational amplifier 14 and the remainder of its circuit and the operation thereof is identical to that described with reference to FIG. 3a. The circuit of FIG. 5 accomplishes the substitution of $E_s^1$, the voltage developed across resistor $R_L^1$, for the reference voltage source 12 normally used. Unlike a standard cell, however, the circuit arrangement of FIG. 5 can supply significant current from the new reference source $E_s^1$ which increases the range and accuracy of overall regulation.

FIG. 6 shows a preferred embodiment of a digital-to-analog converter according to the invention. With the exception of minor changes in the resistance of some components caused by a corresponding change in the resistance of the associated binary-weighted resistor, each stage of the converter is identical, thus only the first is illustrated and described in detail.

As discussed in connection with FIG. 2, in the preferred embodiment, the potential applied to the various binary-weighted resistors in the ladder network is switched between $+E_v$ and $-E_v$. However, it will be appreciated that the circuitry disclosed is equally suitable for switching between $\pm E_v$ and ground, should this be desired. If this were done, it would, of course, be necessary to regulate the ground potential, as well as the supply source, if a high degree of resolution is required.

In FIG. 6 a ladder network 101 comprising a plurality of binary-weighted resistors R, 2R, 4R ... $2^{n-1}$R is connected at one end to a summing circuit 102 hence to an external load 103 which, in the preferred embodiment shown, is the deflection coil of an electron-beam deflection device. It will be appreciated, however, that load 103 may be any external load capable of working with the digital-to-analog converter disclosed.

Input $104_1$ is connected by leads 106a and 106b to essentially identical upper and lower halves of the first stage of the converter. Again, for simplicity, only the upper half of the first stage will be discussed in detail, although both are illustrated. The circuitry and operation of the lower half is entirely analogous to the operation of the upper half, provided, of course, that appropriate corrections are made for the change in polarity of the supply source.

Returning now to the input $104_1$, lead 106a connects the input via a resistor 107a and a capacitor 108a to the base of transistor Q1a. Resistor 109a connects biasing potential from source $-E_v$ to the base of transistor Q1a. The emitter of transistor Q1a is connected to a second biasing potential $-E_b$ via a lead 111a. The collector of transistor Q1a is connected via a resistor 112a and a capacitor 113a to the base of transistor Q2a. A biasing resistor 114a connects the base of transistor Q2a to its emitter and thence via a lead 116a to an unregulated voltage source $+E_v$. The collector of transistor Q2a is connected by a resistor 117a to a feedback loop 118a, a junction $119_1$ and the first binary-weighted resistor R.

The concept of regulating the energizing voltage sources $+E_v$ and $-E_v$ after they have been selectively switched to energize the binary-weighted resistors in ladder network 101 has been previously discussed. To accomplish this regulation, after switching, an operational amplifier 121a having an input 122a and an output 123a is connected via an output resistor 124a and the serial connection of a diode 126a and a Zener-diode 127a to feedback loop 118a. A resistor 128a connects the junction 129a of feedback loop 118a and a resistor 117a to one end of a trimmer resistor 130a and via the slider arm thereof to input 122a. The other end of trimmer resistor 130a is connected via a resistor 125a to an external reference voltage $-E_{ref}$. The output 123a of operational amplifier 121a is also connected via a pair of diodes 131a and 132a to the input 122a thereof. A resistor 133a connects the midpoint of diodes 131a and 132a to ground.

As previously discussed, the lower half of the first converter stage is essentially identical to the upper half just described. However, it will be noted that the polarity of transistors Q1a and Q1b and Q2a and Q2b are reversed. Similarly, lead 111b connects the emitter of transistor Q1b to ground rather than to the biasing voltage $-E_B$ and resistor 109b connects the base of transistor Q1b to the biasing potential $+E_v$ rather than $-E_v$. Similarly, lead 116b connects the emitter of transistor Q2b to $-E_v$ rather than $+E_v$ and the polarity of diodes 126b, 131b, 132b and Zener diode 127b are also reversed.

In operation, assume that a very low potential, illustratively zero volts, is applied to input $104_1$ and is indicative of a binary "one" input to the first stage of the converter. Because the emitter of transistor Q1b is grounded, when zero volts is applied to the base thereof there will be, of course, zero volts on the base-emitter junction of transistor Q1b. Thus, the large positive potential $+E_v$ which is applied to the base of transistor Q1b via biasing resistor 109b maintains transistor Q1b positively turned "Off." This in turn keeps transistor Q2b "Off" which inhibits the application of the $-E_v$ voltage present on lead 116b to the junction point $119_1$ and binary-weighted resistor R.

Resistors 107a and 107b prevent transistors Q1a and Q1b from loading down the input signal on input $104_1$ and capacitors 108a and 108b are provided to speed-up the transient response of transistors Q1a and Q1b. The zero potential which is applied, via lead 106a, to the base of transistor Q1a turns transistor Q1a heavily "On," by virtue of the negative potential $-E_B$ connected to the emitter thereof by lead 111a. The resistor 109a which connects the base of transistor Q1a to biasing source $-E_v$ plays no part in the operation of the circuit at this time. This connection is provided to ensure that transistor Q1a is positively turned "Off" when the input on lead $104_1$ corresponds to a binary "zero" and transistors Q1b and Q2b are conducting.

When transistor Q1a is turned "On" the potential at the collector thereof becomes approximately equal to the negative potential $-E_B$ which is present on its emitter. The base of transistor Q2a on the other hand, is maintained positive because of the positive potential $+E_v$ present on its emitter via lead 116a. Current therefore flows down through current-limiting resistor 112a into the now conducting transistor Q1a and this downward current flow draws current from the base of transistor Q2a and turns transistor Q2a heavily "On" permitting current to flow from source $+E_v$ through resistor 117a to junction $119_1$ and the first binary-weighted resistor R, thence via summing circuit 102 to the load 103.

The value of resistor 112a is selected to limit the current flow through transistor Q1a to a reasonable figure and capacitor 113a is provided to speed-up the transient response of transistors Q1a and Q2a.

As previously discussed with reference to FIG. 3a, the potential at junction 129a is regulated by means of operational amplifier 121a and feedback loop 118a so that the voltage at junction 129a is maintained equal to the potential of reference voltage $-E_{ref}$. Trimmer resistor 130a, which is typically a 20-turn wire wound potentiometer of approximately 1 ohm resistance, is provided for alignment purposes so that the potential at input 122a to operational amplifier 121a is maintained at 0 volts.

Also as previously discussed in connection with FIG. 3a, if for some reason the potential at junction 129a should vary from the reference potential $-E_{ref}$, a compensating, parallel-current is supplied to junction $119_1$ and binary resistor R from feedback loop 118a to maintain the voltage at junction 129a and hence junction $119_1$ constant. The Zener diode 127a, which is connected in the feedback loop 118a, is provided to increase the range of regulation and this diode drops approximately 75 percent of the voltage difference between the output of operational amplifier 121a, which is typically $-5$ volts, and the potential at junction $119_1$, which is typically $+15$ volts, the remaining 5 volts being dropped across resistor 124a. Diode 126a is provided to block leakage current from operational amplifier 121a when current is being supplied to resistor R by the lower half of the circuit, which, of course, only occurs when a binary "zero" signal is present at input $104_1$. Diodes 131a and 132a and resistor 133a are connected across operational amplifier 121a to short it out in this latter condition when operational amplifier 121b is functioning.

The operation of the circuit when a binary "zero" signal is applied to input $104_1$ is entirely analogous. The potential applied to input $104_1$ in that case is typically $-3$ volts, thus the biasing potential $-E_v$ applied to the base of transistor Q1a will turn Q1a "Off" which, in turn, will turn transistor Q2a "Off" disconnecting the positive source $+E_v$ from junction $119_1$ and binary-weighted resistor R. The $-3$ potential applied at input $104_1$ is passed to the base of transistor Q1b via lead 106b and, by virtue of the ground present on the emitter of transistor Q1b from lead 111b, turns transistor Q1b "On." This, in turn, turns Q2b "On" passing the $-E_v$ potential on lead 116b to junction $119_1$ and binary-weighted resistor R thence via summing circuit 102 to the load 103 as before. Operational amplifier 121b and feedback loop 118b act to maintain the potential at junction 129b equal to the potential $+E_{ref}$ applied to the input of operational amplifier 121b, in a manner entirely analogous to the operation of the upper half of the circuit.

As previously discussed, under this condition, operational amplifier 121a will be shorted by diodes 132a and 131a and diode 126a will prevent any leakage to junction $119_1$ from the upper half of the circuit.

The converter stage which has been illustrated and discussed in detail is the most significant stage in the converter. The stages which correspond to the lesser significant digits of the number to be converted are essentially identical eMa3for minor changes in resistance values, etc. Thus, the application of input signals to input circuits $104_2$ through $104_2N_-1$ and the operation of switching circuits $30_{2(a)}$ through $30_{n(a)}$ and $30_{2(b)}$ through $30_{n(b)}$ as well as parallel-current regulating circuits $40_{2(a)}$ through $40_{n(a)}$ and $40_{2(b)}$ through $40_{n(b)}$ need not be discussed in detail.

It is essential, in the first stage of the converter, that resistors 125a, 125b, 128a, 128b as well as binary-weighted resistor R be as accurate as the potential of the reference voltage $+E_{ref}$ and $-E_{ref}$. In the illustrative embodiment of the invention actually constructed, these potentials were known to within one part per million. In succeeding less-significant stages of the converter, these tolerances may be reduced, for example, to two parts per million, four parts per million, eight parts per million, etc. As previously discussed, the reference voltages $+E_{ref}$ and $-E_{ref}$ are advantageously obtained from a standard cell. The standard cell is advantageously maintained in a controlled environment in a temperature controlled oven. It may also be advantageous, under some circumstances, to maintain resistors 125a, 125b, 128a and 128b and the binary-weighted resistors in a temperature controlled oven, although this has not been found necessary in the experimental 18-bit digital-to-analog converter actually constructed. One advantage of switching the binary-weighted resistors between $+E_v$ and $-E_v$ rather than $\pm E_v$ and ground is that there is always a current in the binary-weighted resistors, regardless of the input signals to the various stages. Thus, the binary-weighted resistors are subject to constant $i^2R$ heating and therefore less likely to alter their resistance value, which would, of course, affect the accuracy of the digital-to-analog conversion.

While there has been shown and described the novel features of the invention according to the preferred embodiment, it will be understood that various omissions and substitutions in the circuitry illustrated and in its operation may be made by those skilled in the art without department from the spirit of the invention.

What is claimed is:

1. A circuit for regulating the voltage across a load, the load being connected by a resistive circuit to a source of reversible-polarity energizing voltage, which comprises:

circuitry supplying a positive reference voltage;
a first operational amplifier having a first input connected to ground potential, a second input and an output;
a first resistor connecting said positive reference circuitry to said second input of said first amplifier;
a second resistor substantially equal in magnitude to said first resistor, connecting said load to said second input of said first amplifier;
a first feedback circuit connecting said output of said first amplifier to said load to supply a first compensating current to said load when said load voltage is negative to maintain said load voltage substantially equal in magnitude to said positive reference voltage, regardless of variations in the magnitude of said energizing voltage;
a first diode connected between said output and said second input of said first amplifier, and poled to conduct when said load voltage is positive to disable said first amplifier;
circuitry supplying a negative reference voltage;
a second operational amplifier having a first input connected to ground potential, a second input and an output;
a third resistor connecting said negative reference circuitry to said second input of said second amplifier;
a fourth resistor, substantially equal in magnitude to said third resistor, connecting said load to said second input of said second amplifier;
a second feedback circuit connecting said output of said second amplifier to said load to supply a second compensating current to said load when said load voltage is positive, to maintain said load voltage substantially equal in magnitude to said negative reference voltage, regardless of variations in the magnitude of said energizing voltage; and
a second diode, connected between said output and said second input of said second amplifier, and poled to conduct when said load voltage is positive to disable said second amplifier.

2. A circuit for regulating the voltage across a load, the load being connected by a resistive circuit to a source of reversible-polarity energizing voltage, which comprises:

circuitry supplying a positive reference voltage;
means for comparing the voltage across said load with said positive reference voltage to obtain a first signal related to the difference between said load voltage and said positive reference voltage;
means for supplying a first compensating current to said load according to said first signal so that the effect of said first compensating current on said load tends to decrease said first signal;
means for disabling said first current supplying means when said load voltage is a second polarity, opposite to said first polarity;
circuitry supplying a negative reference voltage;
means for comparing the voltage across said load with said negative reference voltage to obtain a second signal related to the difference between said load voltage and said negative reference voltage;
means for supplying a second compensating current to said load according to said second signal so that the effect of said second compensating current on said load tends to decrease said second signal; and
means for disabling said second current supplying means when said load voltage is said first polarity.

* * * * *

UNITED STATES PATENT OFFICE
CERTIFICATE OF CORRECTION

Patent No. 3,766,402  Dated October 16, 1973

Inventor(s) JAAN RAAMOT

It is certified that error appears in the above-identified patent and that said Letters Patent are hereby corrected as shown below:

Title page and Column 1, the title "DIGITAL-TO-ANALOG CONVERTER PARALLEL-CURRENT VOLTAGE REGULATING CIRCUIT" should read --PARALLEL-CURRENT VOLTAGE REGULATING CIRCUIT--.

In the Abstract, line 1, after "circuit" insert --for use with a digital-to-analog converter--.

In the specification, Column 1, line 12, after "current" insert --voltage--; line 67, "before" should read --before--. Column 2, line 43, "after" should read --after--. Column 3, line 59, "type or" should read --type of--. Column 4, line 61, "after" should read --after--. Column 5, line 39, "known within" should read --known to within--. Column 6, line 7, "FIG. 3 doe" should read --FIG. 3 does--. Column 8, line 47, "poled out so" should read --poled so--. Column 11, line 52, after "-3" insert --volt--. Column 12, line 5, "identical eMa3for minor" should read --identical except for minor--; line 44, "department" should read --departing--.

Signed and sealed this 12th day of March 1974.

(SEAL)
Attest:

EDWARD M. FLETCHER, JR.
Attesting Officer

C. MARSHALL DANN
Commissioner of Patents